United States Patent [19]

Amir et al.

[11] 3,837,837

[45] Sept. 24, 1974

[54] METHOD OF INCREASING SUGAR ACCUMULATION IN PLANT STORAGE ORGANS

[75] Inventors: Jacob Amir, Beer-Sheva, Israel; Joe H. Cherry, West Lafayette, Ind.

[73] Assignee: Purdue Research Foundation, Lafayette, Ind.

[22] Filed: Aug. 5, 1971

[21] Appl. No.: 169,537

[52] U.S. Cl. .................................................. 71/113
[51] Int. Cl. .............................................. A01n 9/24
[58] Field of Search ................. 71/97, 113, 112, 79

[56] References Cited
UNITED STATES PATENTS
3,248,207  4/1966  Knell........................................ 71/97
3,655,573  4/1972  Carlson.................................... 71/97
3,687,992  8/1972  Feiler....................................... 71/97

OTHER PUBLICATIONS

Nickell et al., Haw. Sugar Technol., 24th Conf. Nov. 15–18, 1965, pages 152–163 (page 152 relied upon) 1965.

Primary Examiner—James O. Thomas, Jr.
Attorney, Agent, or Firm—Howard J. Newby; Bruno P. Struzzi; Daniel J. Donovan

[57] ABSTRACT

Sugar accumulation in plant storage organs, especially in the kernels of sweet corn is increased by the introduction, in vivo, of water soluble chelating agents, particularly water soluble salts of aminopolycarboxylic acids, into the plant system approximately one to five days prior to harvest of the plant product at the normal harvest period.

5 Claims, No Drawings

3,837,837

METHOD OF INCREASING SUGAR ACCUMULATION IN PLANT STORAGE ORGANS

BACKGROUND OF THE INVENTION

1. Field of the Invention

This invention generally relates to enhancing the sugar accumulation in plant storage organs and is particularly concerned with a method of increasing the accumulation of sucrose and reducing sugars in sweet corn kernels at the time of harvest.

2. Description of the Prior Art

Sweet corn is normally grown for human food and harvested and sold as an immature fresh crop. The quality of sweet corn determines its market value. Flavor is an important factor involved in the evaluation of corn quality and, although difficult to define and measure objectively, is primarily dependent upon the presence of sugars in the corn kernels. In the ripening process, the sugars are changed rapidly to starch and when the corn is fully matured, the kernels have a high content of starch in place of sugar. Since high quality is closely associated with the sugar content of the kernels, the state of maturity of the corn at the time of harvest is critical. If the corn is harvested too early, the yield will be low and the product will lack consistency; if harvested too late, the product will be over matured and will, therefore, be starchy and tough.

Realizing that changes in the percentage of sugars profoundly affect the sweetness of the corn, considerable efforts have taken place in the past to develop sweet corn hybrid varieties which will retain their sugar content during maturing and during the post harvest holding period since it was early recognized that the rate of sugar loss by the conversion of sugars to polysaccharides is determined, at least in part, by the genetic constitution of the plant. More recently, the conversion of sweet corn sugars to polysaccharides has been successfully regulated (retarded) by treating the plant and/or the produce with pyrophosphate salts as disclosed in co-pending patent application Ser. No. 63,665 filed Aug. 13, 1970, now abandoned, and assigned to the same assignee as the present invention. The increase in sugar content in the storage organs of sugar beet, wheat, rice, sugar cane and other crops, by the same method, can be also anticipated.

SUMMARY OF THE INVENTION

The present invention is predicated on the fact that the rate of sugar conversion during the maturation and post harvest storage of sweet corn is, within certain limits, substantially independent of the quantity of sugars in the corn kernels and, as such, the more sugar which can be translocated from other parts of the plant to the kernels, prior to harvesting the corn, the greater will be the absolute quantity of sugars in the kernels of the post harvested corn at the time of sale and/or processing shortly after harvesting.

Accordingly, it becomes an important object of the present invention to provide a method for increasing the accumulation of sucrose and reducing sugars in the kernels of sweet corn at the time of harvest.

It is another object of the invention to provide a method for increasing the sucrose content in sweet corn at that period in time wherein the corn has matured to the condition which affords the best practical yield.

It is still another object of the invention to provide a method for attaining sweet corn and other plants which accumulate sugar with a significantly higher sugar content in the kernels or other storage organs than heretofore attainable in order to increase the sugar amount or compensate for any resultant loss of sugars upon storage and/or processing of the corn after harvest.

It is a feature of the present invention that it incorporates a method of increasing the accumulation of sugars in the storage organs of plants such as the kernels of sweet corn which is compatible and mutually cooperative with the method of regulating the conversion of sugars to polysaccharides disclosed in the copending patent application Ser. No. 63,665, now abandoned, and, when combined, the methods produce a cumulative result and provide sweet corn and other vegetable products of exceptionally high quality.

Briefly stated, it has been discovered that the above mentioned objects can be achieved by the treatment of the corn plant with certain chelating agents before harvesting the corn. It has been found that treatment by injection of the corn ear or by foliar application, with water soluble salts of aminopolycarboxylic acids, nitrilotriacetic acid and iminodiacetic acid about one to five days prior to harvest will greatly increase the level of sugar in the corn kernels at the time of harvest.

It is tentatively theorized that the chelating agent treatment method of the invention increases the permeability of the plant cell membranes and thus facilitates the translocation of sugars from the foliage of the plant to the storage tissues. The chelating agent, in all probability, influences the magnesium and/or calcium crosslinkage between subunits of the cell membranes and, by removing and sequestering these constituents, effects a less selective barrier by decreasing the blocking to the passage of sugars from the vascular bundles and parenchyma tissue to the storage tissues.

Surprisingly, it has been found that the permeability of plant cells, particularly the several layers of cells in the corn plant separating the vascular bundle at the edge of the kernel from the endosperm tissue, is not influenced by all chemicals having a known chelating capability — germane to the unobviousness of the invention is the discovery that only the aminopolycarboxylic acids — including for purposes of this specification — nitrilotriacetic acid and iminodiacetic acid and their water soluble salts have been found to significantly effect the permeability of this membranous portion of the sweet corn plant with response to the diffusion of plant sugars into the endosperm tissue of the kernels.

By propitiously timing the treatment of the corn plant with chelating agents, it is possible to enhance the translocation of sugars from the vascular bundles through the parenchyma tissue to the endosperm tissue of the corn kernel to an extent such that at harvest the sugar content of the kernel is approximately 50 percent to 100 percent greater than it would be without such treatment. This, and other features and advantages, will become more fully apparent from the following detailed description of the inventive methods of treating sweet corn.

DESCRIPTION OF THE PREFERRED EMBODIMENTS

The invention comprehends a novel method for facilitating the translocation of sucrose within the sweet corn plant. Although applicable to other plants such as rice, wheat, oat, barley, rye and other sugars producing plants, the invention finds its greatest utility with sweet corn — corn which is intended for human consumption.

It is generally known that the sweet corn plant sugars, particularly sucrose, are formed in the leaf by a photosynthetic reaction utilizing carbon dioxide and water. The soluble sugar materials, once formed, are conducted from the leaf to the kernels of corn through the membrane structure of the plant, probably by forces such as osmotic pressure. By increasing the permeability of the cell membranes, particularly those cells which represent the most formidable barrier to the passage of the sugar solutes, it has been found possible to increase the sugar content of the corn kernels.

Certain classes of chelating agents have been found which significantly increase the permeability of the cellular membrane barrier of the plant and particularly the barrier located in the vicinity of the base of the sweet corn kernel. Chelating agents which have been discovered suitable for this purpose are the aminopolycarboxylic acids, including nitrilotriacetic acid, and iminodiacetic acid.

The aminopolycarboxylic acids and their water soluble salts, other than nitrilotriacetic and iminodiacetic acids, are particularly effective and the low cost, readily available, disodium salts of ethylenediaminetetraacetic acid are preferred.

The aforementioned chelating agents when injected directly into each individual ear of corn, are effective in amounts of from about 5 ml to about 10 ml of aqueous solution at concentrations ranging from about $10^{-3}$ molar to about $10^{-2}$ molar. The amount of chemical required to bring about the desired increase in sugar level is dependent upon the variety of the sweet corn plant being treated and the particular growing conditions — weather, soil, fertilization, etc. Therefore, the above values of concentrations and amounts represent a suitable enabling range of quantity of chelating agent within which an agronomist skilled-in-the-art may readily establish a specific dosage of treatment per the illustrative examples provided herein below.

Although injection of chelating agent solution directly into the central parenchyma tissue of the ear of corn is the most effective method of introducing the agent into the plant, foliar application is the most practical form of treatment from a commercial utility viewpoint and the terms "treatment" and "application" as used herein denote a systemic form of application and are intended to include all methods of varying degrees of effectiveness of incorporating the chelating agents into the said corn plant and product thereof.

The optimum period for injecting the corn ears is also dependent upon many factors including the corn variety, moisture content, ambient temperature and other growing conditions. It has been established, however, that treatment, either by injection or foliar application, should be made from about a maximum of 5 days prior to the date the corn would be normally harvested to a minimum of about 1 day prior to the harvest period. In most instances, it has been determined that treatment approximately 48 hours prior to harvest produces the best results. The essential criterion, of course, with respect to the point of time for treating the corn with the chelating agent is that the agent is to be given sufficient time to alter the permeability of the pertinent cell structure and that the photosynthesized sugars are to be given sufficient time to transfer and accumulate in the corn kernels so as to maximize sugar levels at the time of harvest.

The corn plant must be treated by the method of the invention when the ears are still attached to the stalk since the chelating agent alters the biological process only to the extent of increasing the permeability of the cellular membranes in order to permit a greater amount of sugars to permeate into the corn kernel at an otherwise faster rate — in other words, there must be a source of sugar supply available and ready for translocation at the time the chelating treatment is effected.

Injection of the chelating agent into the detached ear of corn has been shown to have no effect on the sugar content of the corn kernels. However, if an artificial source of sugar is available to the detached ear, as for example exogenous sucrose introduced by injection in the ear of corn, a significant uptake of sugar in the corn kernels can be observed compared to that increase, if any, in an ear of corn not treated with a chelating agent of the invention.

Treatment of the corn plant with the chelating agents of the invention does not appear to influence the conversion of sugars in the kernels of corn to polysaccharides. This biological process is the result of a series of concurrent enzyme catalyzed reactions whose rates and equilibria can be altered and the amount of sugar conversion to starch inhibited by the application of pyrophosphate salt as disclosed in co-pending patent application Ser. No. 63,665 filed Aug. 13, 1970, now abandoned, and assigned to the same assignee as the instant application.

Within the scope of the present invention and, in fact, a preferred embodiment of the invention is to treat the corn plant with the chelating agent prior to harvest (about one to five days) and then, immediately upon harvest, treat the detached ears with a pyrophosphate solution, preferably by dipping or spraying the detached ears in said pyrophosphate solution, as disclosed in the above-mentioned co-pending patent application. The two treatments are compatible and the results produced in the way of increasing the sugar level within the corn kernel are cumulative.

Although pyrophosphate salts are known to be chelating agents, it has been determined that they do not significantly influence the permeability of the sweet corn membranes and, conversely the chelating agents of this invention appear to have no significant effect on the sugar to polysaccharide conversion process taking place within the corn kernel.

In those instances wherein the corn is not treated with pyrophosphate, the chelating agent treatment will increase the sugar accumulation prior to harvest but upon storage, the rate at which the sugar converts to starch remains unchanged — nevertheless, in absolute terms the chelate treated corn will contain as much as two to three times more sugar than those ears not treated. Also, and most important, the rate of conversion of sugars to polysaccharides can be appreciably decreased by subsequent treatments of the detached ears with pyrophosphate.

The term "sugar" used throughout this specification is intended to encompass those sugars normally current in sweet corn and includes sucrose and reducing sugars such as fructose and glucose.

It has been determined that both the disaccharide and monosaccharide levels can be increased by the method of the invention which will now be described more specifically by reference to the following examples. It should be understood, however, that these examples are merely meant to be illustrative and the invention is not to be limited thereto.

EXAMPLE I

A small plot of hand pollinated sweet corn of the variety Golden Beauty was grown in a greenhouse. Individual ears of corn, while still attached to their respective plants, were treated with an aqueous solution of disodium salt of ethylenediaminetetraacetic acid ($Na_2EDTA$) to determine the effect of the agent on the sucrose and reducing sugar accumulation in the kernels. The ears of corn were injected with 10 ml of an aqueous solution of $Na_2EDTA$ into the central parenchyma tissue. Three concentrations of chelating agent solutions were employed to establish the effect of this variant on sugar accumulation. The ears were injected 48 hours prior to harvesting and at harvest, the ears were analyzed for sugar and reducing sugar content. The analytical results are shown in Table I.

TABLE I

Effect of $Na_2EDTA$ on Sucrose and Reducing Sugar Content of Sweet Corn
(Milligrams Per Gram of Dry Weight of Corn Kernels)

| TREATMENT 48 Hrs. Before Harvest | AT HARVEST | | |
|---|---|---|---|
| | REDUCING SUGAR | SUCROSE | TOTAL SUGAR |
| Control | 75* | 170 | 245 |
| $Na_2EDTA$ $10^{-3}$ Molar Concentration | 71 | 189 | 260 |
| $Na_2EDTA$ $10^{-2}$ Molar Concentration | 59 | 248 | 307 |
| $Na_2EDTA$ $6 \times 10^{-2}$ Molar Concentration | 66 | 217 | 283 |

* All values in tables are average of three separate analyses.

The data show that the corn kernels treated with $Na_2EDTA$ by hypodermic injection of the solution directly into the cob of the ear have an increased sucrose and reducing sugar accumulation compared with the control at the time of harvest. The data also indicate that for the volume (10 ml) of $Na_2EDTA$ injected, the $10^{-2}$ molar was the most effective concentration.

EXAMPLE 2

Relative Effectiveness of Methods of Applying $Na_2EDTA$ To Sweet Corn

Sweet corn plants similar to those used in Example I and also grown in a greenhouse were treated with $Na_2EDTA$ by (1) injecting the aqueous solution directly into the ear, (2) spraying the plant foliage with the solution and, (3) applying the solution to the roots of the plant. The sugar accumulation data are shown in Table II.

TABLE II

Effect of $Na_2EDTA$ on Sucrose and Reducing Sugar Content of Sweet Corn
(Milligrams Per Gram of Dry Weight of Corn Kernels)

| TREATMENT 48 Hrs. Before Harvest | AT HARVEST | | |
|---|---|---|---|
| | REDUCING SUGAR | SUCROSE | TOTAL SUGAR |
| Control | 55 | 156 | 211 |
| $Na_2EDTA$ — Injection $10^{-2}$ Molar (10 ml) | 60 | 301 | 361 |
| $Na_2EDTA$ — Foliar Spray $10^{-2}$ Molar[1] | 50 | 208 | 258 |
| $Na_2EDTA$ — Root Application — $6 \times 10^{-2}$ Molar[2] | 53 | 144 | 197 |

(1) To run-off; approximately 500 ml.
(2) Drenching the soil with 10 ml of solution.

The data show the increased accumulation of sucrose and reducing sugar in the corn kernels of the ear injected with 10 ml of $10^{-2}$ molar $Na_2EDTA$ and confirm the previous findings shown in Table I. The result of the foliar spray treatment show that the $Na_2EDTA$ also acts through the leaf; however, this method of application is not as effective as the direct injection into the corn ear since, as shown in the data, the increase in sucrose accumulation was only 33 percent as compared with the control versus the 92 percent increase when the $Na_2EDTA$ was injected directly into the corn ear.

The data also indicate that the application of $Na_2EDTA$ through the plant root system had no apparent effect on sucrose accumulation in the harvested ear of corn.

EXAMPLE 3

The treatment of a selected sample of sweet corn grown in the greenhouse by foliar spray of $Na_2EDTA$ was repeated to confirm the results shown in Example II. The data are shown in Table III.

TABLE III

Effect of $Na_2EDTA$ on Sucrose and Reducing Sugar Content of Sweet Corn
(Milligrams Per Gram of Dry Weight of Corn Kernels)

| TREATMENT-FOLIAR SPRAY 48 Hrs. Before Harvest | AT HARVEST | | |
|---|---|---|---|
| | REDUCING SUGAR | SUCROSE | TOTAL SUGAR |
| Control | 62 | 131 | 193 |
| $Na_2EDTA$ — $10^{-2}$ Molar | 44 | 160 | 204 |
| $Na_2EDTA$ — $6 \times 10^{-2}$ Molar | 66 | 205 | 271 |

The data confirm the results shown in Table II and show that the application of $Na_2EDTA$ by spraying increases the accumulation of sucrose at the time of harvest by about 22 percent and 56 percent, as compared with the control, by the $10^{-2}$ and $6 \times 10^{-2}$ molar treatments respectively.

EXAMPLE 4

The effect of $Na_2EDTA$ on the accumulation of sucrose and reducing sugars in corn grown in the field was evaluated. In order to insure uniform maturity of corn ears, the sweet corn plants were hand pollinated. At 48 hours before harvesting the corn, 10 ml of an aqueous solution of $Na_2EDTA$ was introduced into the central parenchyma tissue of each of nine selected ears of corn which were attached (on the plant). The Na$_2$EDTA was supplied by injection with a hypodermic needle employing three concentration levels — $10^{-3}$ molar, $10^{-2}$ molar and $5 \times 10^{-2}$ molar to determine the optimum level. A comparison of sucrose content and reducing sugar content of the treated ears of corn with two controls at the time of harvest is shown in the first three columns of Table IV. One control represented an ear of corn with no treatment whatsoever, and the second control represented an ear of corn injected with 10 ml of distilled water. The sucrose and reducing sugar content of the treated ears and the controls were measured at 24 hours after storage at 25°C. and after 36 hours of storage. The data are tabulated below (Table IV).

A comparison of the Na$_2$EDTA treated samples with the two controls at the time of harvest shows the Na$_2$EDTA treatment to produce a decided increase in the reducing sugar and sucrose levels in the corn kernels. On average, the Na$_2$EDTA treatment increased the sucrose level by about half and roughly doubled the reducing sugar content of the corn kernels.

Subsequent to 24 hours storage at room temperature (25°C.), the levels of sucrose in the control tissue decreased by about 65 percent and the same trend was observed in the Na$_2$EDTA treated ears. Generally, however, the Na$_2$EDTA treated ears, on the average, contain two to three times more sucrose than that of the controls after 24 hours storage.

After 36 hours storage at 25°C., the sucrose and reducing sugar content differences between the controls and the Na$_2$EDTA samples diminished. Due to a high initial sucrose content effected by the Na$_2$EDTA treatment, however, the sucrose levels after 36 hours were slightly higher in the treated ears than the levels in the controls.

EXAMPLE 5

In order to confirm the results obtained in Example IV, the test was repeated and the data shown in Table V were generated from a duplicate experiment performed exactly the same in manner as that described in Example IV.

In this test, the Na$_2$EDTA treatment, on the average, increased the sucrose content at the time of harvest by approximately 90 percent compared with the controls and the reducing sugar content was approximately doubled as was the case in Example IV.

A decrease in the sucrose and reducing sugar content similar to that experienced in Example IV for all of the samples was again observed after 24 hours and 36 hours storage periods.

The data obtained from the Example V test confirmed those data obtained from the test described in Example IV and both tests show the dramatic increase in the sucrose and reducing sugar content of sweet corn kernels when treated 48 hours prior to harvest with Na$_2$EDTA.

EXAMPLE 6

To confirm the discovered functionability of Na$_2$EDTA toward effecting a greater permeability of plant tissue, a test was run in which ears of corn were treated with Na$_2$EDTA by injection as described in Example IV. Selected corn ears were then injected with 5 ml of 0.3 molar sucrose 5 hours after the treatment

TABLE IV

Effect of Disodium EDTA on Sucrose and Reducing Sugar Content of Sweet Corn — Grown in the Field (Milligrams/Gram of Dry Weight of Corn Kernels)

| Treatment | HARVEST | | | (24 HR. STORAGE) | | | (35 HR. STORAGE) | | |
|---|---|---|---|---|---|---|---|---|---|
| | Reducing Sugar | Sucrose | Total Sugar | Reducing Sugar | Sucrose | Total Sugar | Reducing Sugar | Sucrose | Total Sugar |
| Control | 66 | 204 | 270 | 42 | 78 | 120 | 36 | 64 | 100 |
| Distilled H$_2$O | 65 | 181 | 246 | 53 | 63 | 116 | 43 | 53 | 96 |
| Na$_2$EDTA $10^{-3}$ Molar | 66 | 271 | 337 | 43 | 85 | 128 | 43 | 71 | 114 |
| Na$_2$EDTA $10^{-2}$ Molar | 128 | 283 | 411 | 60 | 107 | 167 | 47 | 98 | 145 |
| Na$_2$EDTA $5 \times 10^{-2}$ Molar | 111 | 318 | 429 | 45 | 196 | 241 | 47 | 58 | 105 |

TABLE V

Effect of Disodium EDTA on Sucrose and Reducing Sugar Content of Sweet Corn (Milligrams/Gram of Dry Weight of Corn Kernels)

| Treatment | HARVEST | | | 24 HR. STORAGE | | | 36 HR. STORAGE | | |
|---|---|---|---|---|---|---|---|---|---|
| | Reducing Sugar | Sucrose | Total Sugar | Reducing Sugar | Sucrose | Total Sugar | Reducing Sugar | Sucrose | Total Sugar |
| Control | 62 | 191 | 253 | 44 | 65 | 109 | 38 | 57 | 95 |
| H$_2$O | 68 | 206 | 274 | 55 | 63 | 118 | 41 | 61 | 102 |
| Na$_2$EDTA — $10^{-3}$ Molar | 116 | 297 | 413 | 86 | 184 | 270 | 66 | 78 | 144 |
| Na$_2$EDTA — $10^{-2}$ Molar | 147 | 393 | 540 | 98 | 167 | 265 | 81 | 86 | 167 |
| Na$_2$EDTA — $5 \times 10^{-2}$ Molar | 160 | 386 | 546 | 98 | 184 | 282 | 100 | 86 | 186 | with Na$_2$EDTA. The resulting data on sucrose accumulation in the corn kernels are shown in Table VI.

TABLE VI

Effect of Na$_2$EDTA on Sucrose Transportation Within The Parenchyma and Endosperm Tissues of Detached Corn (Milligrams/Grams Dry Weight of Corn Kernels)

| | SUCROSE CONTENT | | | |
|---|---|---|---|---|
| | No Sucrose Sol'n Injected | | Sucrose Sol'n Injected | |
| Treatment | Harvest | 24 Hrs. Post Harvest | Harvest | 24 Hrs. Post Harvest |
| Control | 49.8 | 24.9 | 52.3 | 30.3 |
| H$_2$O | 69.1 | 34.4 | 49.9 | 32.4 |
| Na$_2$EDTA — 5× 10$^{-3}$ Molar | 46.2 | 29.2 | 51.3 | 47.5 |
| Na$_2$EDTA — 10$^{-2}$ Molar | 58.4 | 32.1 | 55.6 | 50.3 |

The data in Table VI show that there was a significant uptake of sucrose in the ears of corn treated with EDTA confirming the discovery that EDTA enhances sucrose translocation and accumulation in the corn kernel.

EXAMPLE 7

The effectiveness of several chelating agents on the accumulation of sucrose and reducing sugars in the kernels of sweet corn was determined by injecting 10 ml of each agent in aqueous solution at a 10$^{-3}$ molar concentration into the cob of the ear as described in Example 2. The data showing the effects of the chelating agents on sucrose and reducing sugar accumulation at harvest and 24 hours after harvest are shown in Table VII.

TABLE VII

Effect of Different Chelators on the Accumulation of Sucrose and Reducing Sugar of Sweet Corn. The results Were Obtained from Sweet Corn Grown in the Greenhouse

| | SAMPLE I (AT HARVEST) | | | | SAMPLE II (24 HRS. AFTER HARVEST) | | | |
|---|---|---|---|---|---|---|---|---|
| Chelator* | Total | Red. Sug. | Sucrose | % of Sucrose | Total | Red. Sug. | Sucrose | % of Sucrose |
| | (Mg/g dry weight of corn kernel) | | | | | | | |
| NTA | 261 | 63.0 | 198 | 163 | 152 | 59 | 93 | 152 |
| IDA | 234 | 56.0 | 178 | 145 | 145 | 45 | 100 | 165 |
| 8 HQ | 168 | 34.2 | 134 | 110 | 94 | 32 | 61 | 108 |
| 4 HQ | 192 | 37.4 | 155 | 128 | 90 | 24 | 66 | 118 |
| EDTA | 242 | 60.1 | 182 | 150 | 118 | 40 | 78 | 127 |
| Control | 157 | 36.7 | 121 | 100 | 104 | 32 | 72 | 100 |

* The following abbreviations are used:
NTA — Nitrilotriacetic Acid

The data on Table VII show that some other chelators such as NTA and IDA are as effective as EDTA whereas 8HQ and 4HQ are not as effective in increasing the accumulation of sugars in the kernels of sweet corn.

In summary, it has been discovered that certain classes of chelating agents have been found which significantly increase the permeability of the cellular membrane barrier of the plant and particularly the barrier located in the vicinity of the base of the sweet corn kernel. Agents which have been discovered suitable for this purpose are the aminopolycarboxylic acids and their water soluble monovalent salts.

The preferred chelating agents are the alkylenediaminetetracarboxylic acids or salts thereof in which the alkylene group is ethylene or propylene, the carboxylic acid group is the acetic or propionic acid group, and the metal cation of the salt is edible and can be sodium, potassium and other monovalent cations or mixtures of two or, probably three monovalent cations.

The above-named chelating agents are water soluble to a sufficient degree to facilitate the translocation of plant sugars and it should be understood that the expression "aminopolycarboxylic acid compound" as used in this specification and claims designates generically the above acids and salts and related compounds such as nitrilotriacetic acid and iminodiacetic acid which can be used as chelating agent. The low cost, readily available, sodium salts of ethylenediaminetetraacetic acid are most preferred.

What is claimed and desired to be secured by Letters Patent is:

1. The method of increasing the accumulation of sugars in sweet corn kernels of a growing corn plant which comprises applying a chelating agent to the plant from about one day to about five days prior to removal of the corn from the plant, said chelating agent being an aqueous solution of ethylenediaminetetraacetic acid in a concentration and amount sufficient to increase the accumulation of sugars in the endosperm tissue of the plant.

2. The method of claim 1 wherein the chelating agent is the monovalent salt of ethylenediaminetetraacetic acid.

3. The method according to claim 1 wherein the chelating agent is applied to the plant by spraying the chelating agent onto the growing plant.

4. The method according to claim 1 wherein the chelating agent is supplied by injection into the growing plant.

5. The method according to claim 4 wherein a quantity of chelating agent ranging from about 5 ml. to about 10 ml. of from about 10$^{-3}$ to about 10$^{-2}$ molar concentration is injected into each ear of corn on the growing plant.

* * * * *